United States Patent [19]

Emerson et al.

[11] Patent Number: 4,775,996
[45] Date of Patent: Oct. 4, 1988

[54] HYBRID TELEPHONY COMMUNICATION SYSTEM

[75] Inventors: Victor F. Emerson, Ottawa; Cecil H. Bannister, Kanata; Mahshad Koohgoli, Nepean, all of Canada

[73] Assignee: Northern Telecom Limited, Montreal, Canada

[21] Appl. No.: 102,944

[22] Filed: Sep. 30, 1987

[51] Int. Cl.⁴ .............................................. H04Q 7/04
[52] U.S. Cl. ......................................... 379/56; 379/61
[58] Field of Search ...................... 379/61, 62, 63, 56; 455/601, 603, 607

[56] References Cited

U.S. PATENT DOCUMENTS

| | | |
|---|---|---|
| 3,513,443 | 2/1967 | Andersen ........................... 455/603 |
| 4,450,319 | 5/1984 | Lucey ................................. 379/61 |
| 4,456,793 | 6/1984 | Baker et al. ......................... 379/61 |
| 4,465,902 | 8/1984 | Zato ..................................... 379/61 |
| 4,659,878 | 4/1987 | Dinkins ............................... 370/71 |
| 4,669,108 | 5/1987 | Deinzer ............................... 379/61 |

*Primary Examiner*—Robert Lev
*Attorney, Agent, or Firm*—Robert C. Hogeboom

[57] ABSTRACT

A wireless telephony system comprising a base station and at least one portable device. The base station employs a ratio frequency (RF) receiver and an optical transmitter. The portable device employs an optical receiver and an RF transmitter.

6 Claims, 2 Drawing Sheets

HYBRID TELEPHONY COMMUNICATION SYSTEM

This invention relates generally to communication systems and more particularly to a hybrid wireless telephony communication system using both radio frequency (RF) channels and infra-red (IR) channels.

BACKGROUND OF THE INVENTION

Wireless or cordless telephony systems are well known. A radio frequency wireless telephony system uses a well-known technology whose characteristics have both advantages and disadvantages. In such an RF system the transmitter components are relatively small, light, and low in power consumption compared to the receiver components which are heavy power consumers.

In using an RF system, there is no need to have a line-of-sight relation between the transmitter and the receiver; but one disadvantage of this is that the RF signal can be monitored at a distance.

Another aspect of RF is the regulatory environment in certain countries such as Canada and the U.S.A. A two-way RF system has regulatory restrictions in Canada and the U.S.A., although a one-way voice communication system (e.g. a wireless microphone) is currently permitted.

In contrast to an RF system, a two-way IR (infra-red) system is not currently subject to government regulation (in Canada and the U.S.A.). An IR system is suitable for multi-channel use. In an open-office environment, a line-of-sight relation is needed between the transmitter and the receiver, and a warning signal may be needed to correct operator misuse (i.e. alerting the operator to an interruption of the beam or to moving out of range).

In contrast to the RF system, the receiver components of an IR system are relatively small, light, and low in power consumption, whereas the IR transmitter requires much more power than does the RF transmitter.

SUMMARY OF THE INVENTION

The present invention comprises a base station and a portable device. The base station is fixed in the workplace; the portable device is carried by the user.

The base station contains an RF receiver and an IR transmitter. The portable device contains an RF transmitter and an IR receiver. Thus, the present invention consists of a hybrid of two technologies: the two-way link between the base station and the portable uses IR from the base station to the portable device and RF from the portable device to the base station.

BRIEF DESCRIPTION OF THE DRAWINGS

The invention will now be described in more detail with reference to the accompanying drawings wherein like parts in each of the several figures are identified by the same reference character, and wherein.

DETAILED DESCRIPTION

Figure 1:
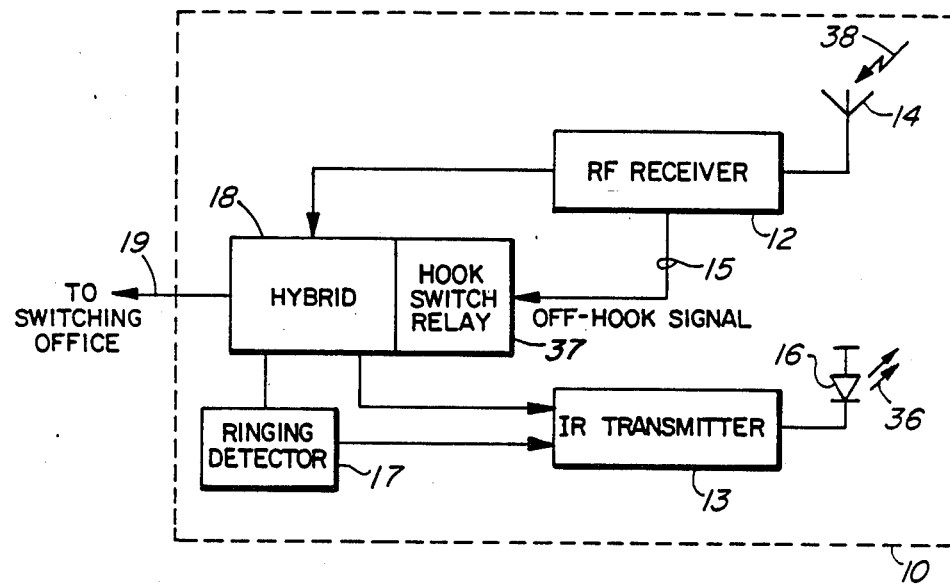
FIG. 1 is a simplified block diagram of a base station constructed according to the present invention.
Figure 2:
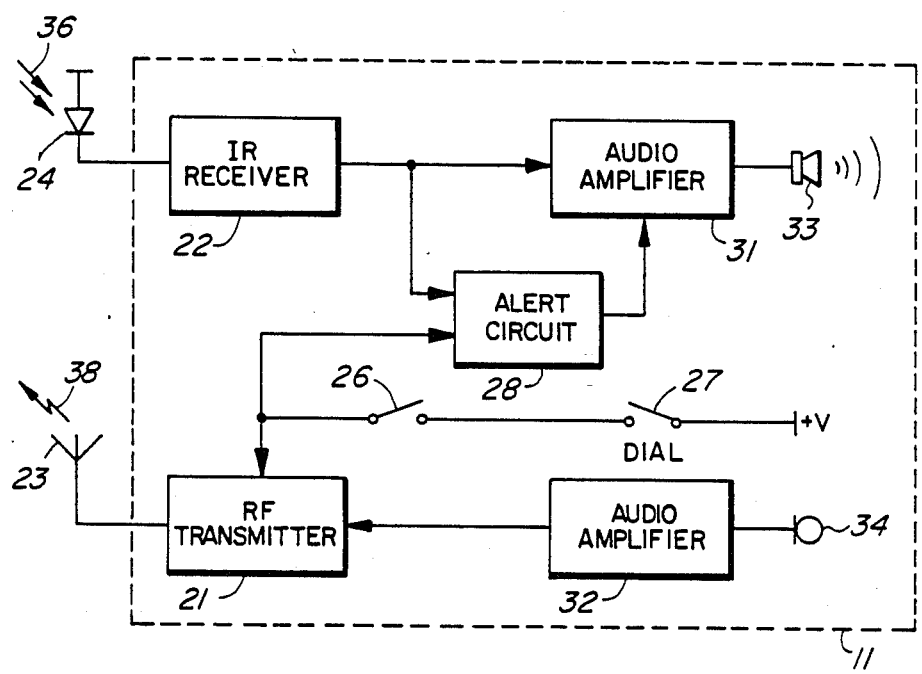
FIG. 2 is a simplified block diagram of a portable device constructed according to the present invention.
Figure 3:
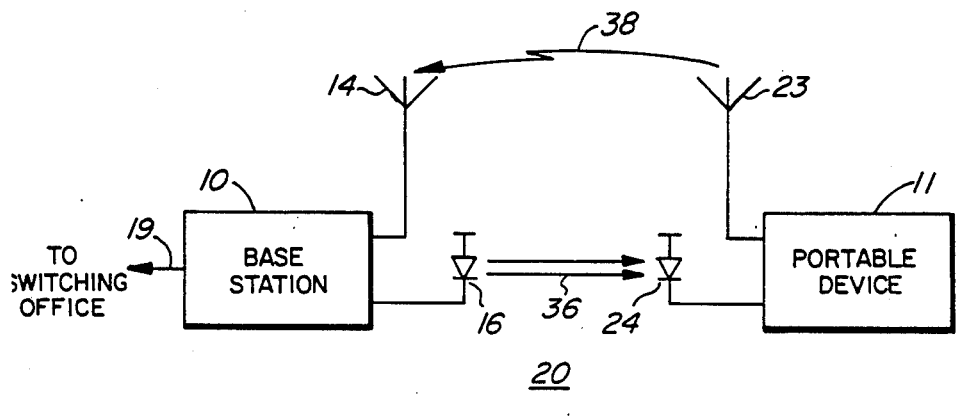
FIG. 3 is a simplified block diagram of the communication system os the present invention comprising one base station and one portable device.

The hybrid communication system 20 (FIG. 3) of the present invention comprises a base station 10, as shown in FIG. 1, and a portable device 11 as shown in FIG. 2.

Base station 10 of FIG. 1 comprises an RF receiver 12, and IR transmitter 13. Also included are RF antenna 14, IR LED (light emitting diode) 16 and normal telephony circuits such as ringing detector 17 and a four-wire/two-wire hybrid 18, all interconnected as shown in FIG. 1. A connection to a switching office (not shown) is made via twisted pair 19. On the receive path (from the switching office) the signal from twisted pair 19 is fed, via hybrid 18, into IR transmitter 13 and thence via LED 16 and optical signals 36 to portable device 11. LED 16 is a conventional infra-red light emitting diode (LED) for converting electrical signals into optical signals.

Ringing detector 17 detects incoming calls (from the switching office) and causes an alerting tone to be transmitted by IR transmitter 13 to portable device 11. RF receiver 12 receives voice information, via RF signals 38, from portable device 11 and sends it, via hybrid 18, to twisted pair 19.

Hook switch relay 37 in base station 10 is operated in response to off-hook signal 15 derived from RF receiver 12. Once an RF carrier is detected on a particular radio channel, off-hook signal 15 is enabled and base station 10 goes "off-hook" (i.e. hook switch relay 37 is closed). Similarly, once the RF carrier is lost (e.g. due to portable 11 turning its transmitter off) hook switch relay 37 will be opened (i.e. base station 10 goes "on-hook").

As the functions of the various components of base station 10 are the same as in conventional all RF base stations, they will not be described in any greater detail.

FIG. 2 depicts a simplified block diagram of portable device 11. Portable device 11 comprises an RF transmitter 21, and an IR receiver 22. Also included are RF antenna 23, IR photodiode 24, audio amplifiers 31 and 32, speaker 33, microphone 34 and normal telephony circuits such as hook-switch 26, dial contacts 27, and an alert circuit 28, all interconnected as shown in FIG. 2.

IR receiver 22 (which by nature consumes very little power) receives the optical signals 36, from base station 10, and converts them into electrical signals which, after amplification by audio amplifier 31 are fed to speaker 33.

The user's voice is picked up by microphone 34, amplified by audio amplifier 32, and fed to RF transmitter 21 (with a range of approximately 50 to 100 feet) which outputs RF signals 38. Hook-switch 26 on portable device 11 actuates RF transmitter 21. RF transmitter 21 uses very little power (typically 1 milliampere at 1.5 volts); IR receiver 22 is also a low power device.

For incoming calls, the ringing voltage is detected, in base station 10, by ringing detector 17. This circuit activates IR transmitter 13, which causes it to send a predetermined tone sequence via IR LED 16. In receiver 11, this predetermined sequence is received by IR receiver 22, and detected by alert circuit 28, which causes audio amplifier 31 to be activated, alerting the user via speaker 33.

As the functions of the various components of portable device 11 are the same as in conventional all RF portable devices, they will not be described in any greater detail.

As can be seen from FIGS. 1 and 2, base station 10 contains an RF receiver 12 and an IR transmitter 13.

Portable device 11 contains an RF transmitter 21 and an IR receiver 22. Thus, the present invention consists of a hybrid of two technologies: the two-way communications link between base station 10 and portable 11 uses IR (infra-red) radiation from base station 10 to portable 11, and uses RF (radio frequency) radiation from portable 11 to base station 10.

The hybrid communication system of the present invention has several advantages over a wholly RF or a wholly IR system. Firstly, the system of the present invention assigns the relatively large, heavy, and power-hungry components to the base station 10, with the relatively lighter, smaller, and less power-consuming components in portable device 11. Thus, the IR transmitter 13 and the RF receiver 12 are both in base station 10, with the IR receiver 22 and RF transmitter 21 in portable device 11. Furthermore, this doubling or channels per technology per unit area also reduces either the bandwidth demand for any one technology or the number of base-stations required per unit area, compared to a single-technology (all RF or all IR) alternative.

Secondly, the use of one channel per technology per each two-way communications link effectively doubles the number of channels available per unit of area, thereby reducing the risk of interference or loss of privacy.

Thirdly, the system "trains" the user. Because the transmitted voice (from portable 11) uses an RF link, it is unlikely that the user would inadvertently break this link by turning away. The received voice (at portable 11) depends upon the integrity of the IR link which, because it is line-of-sight, is more prone to accidental or environmental disruption than is the RF link. Thus, misuse of the system by the user of portable 11 will cause that user to lose the incoming voice before his voice is lost. Consequently, the user (of portable 11) will receive immediate feedback about the misuse with little risk or penalty to the far-end user. Thus, no additional signal is needed to warn about interruption of the link or "out-of-range" use.

The hybrid system also has an advantage over wired system when the communications capabilities of older buildings are being upgraded. Wired systems require cabling to each work space, involving considerable expense, labour, and mess. In contrast, wireless systems require wiring only to the base stations; this requires less labour than rewiring each work space, because the base stations can be common to a small number of users. However, it is also possible in some instances to mount the base stations on the ceiling, thereby avoiding extensive floor-level work and thereby cutting labour and cost significantly.

Other considerations include the fact that the hybrid system is believed to ensure a level of security for telephone conversations that is consistent with a corded connection in the open office. The received voice is believed to be no more susceptible to interception than is a corded link, because this IR path requires a line-of-sight link for reception (although base stations that are mounted on the ceiling or "jiffy" poles may work against this advantage). The transmitted voice is susceptible to RF interception, but as this device is positioned for the open office the loss of security is believed to be negligible; one's voice can often be overheard by people working nearby even when a corded handset is being used. Unlike with a two-way RF system, electronic RF eavesdropping would only detect the side of the conversation available to people working nearby. Thus, the level of security provided by the hybrid system is believed to be consistent with that provided by a corded link.

Lastly, because RF is used in only one direction, the system can be used as a wireless microphone and hence can be free of current government regulations such as those of the FCC, DOC, etc.

EXAMPLE

Portable device 11 is well suited for open-office wireless voice communication. The user can carry portable device 11 while involved in telephone conversation. The fact that the portable 11 is cordless enables the user to move around in the immediate office area while speaking. If portable device 11 is body-worn, the user's hands are free as well.

Portable 11 helps even a naive user determine the area within which the device can be used, for when the user strays too far from base station 10 the received voice is lost; however, there is little risk that the transmitted voice (from portable 11) will be lost in this circumstance.

What is claimed is:

1. A telephony communications system for providing wireless communications between a base station and a portable device, said telephony communications system comprising:
   a base station for receiving information from a telephony switching office, said base station having an optical transmitter for transmitting to said portable device information received from said switching office, and a radio frequency receiver for receiving information from said portable device and relaying said information from said portable device to said switching office;
   at least one portable device for receiving information from said base station in the optical frequency spectrum and for sending information to said base station in the radio frequency spectrum.

2. The telecommunications system of claim 1 wherein said optical frequency spectrum is in the infra-red range.

3. A base station for use in a wireless telephony communications system that provides wireless communications between said base station and a portable device said base station comprising:
   interface means for connecting said base station to a telephony switching office;
   an optical transmitting means for transmitting information received from said switching office; and
   a radio frequency receiver means for receiving information in the radio frequency spectrum emanating from said portable device.

4. The base station of claim 3 wherein said optical transmitting means operates in the infra-red frequency spectrum.

5. A portable device for use in a wireless telephony communications system that provides wireless communications between a base station and said portable device, said portable device comprising:
   a radio frequency transmitter means for transmitting information from said portable device to said base station; and
   an optical receiver means for receiving information in the optical frequency spectrum emanating from said base station.

6. The portable device of claim 5 wherein said optical receiver means operates in the infra-red frequency spectrum.

* * * * *